UNITED STATES PATENT OFFICE.

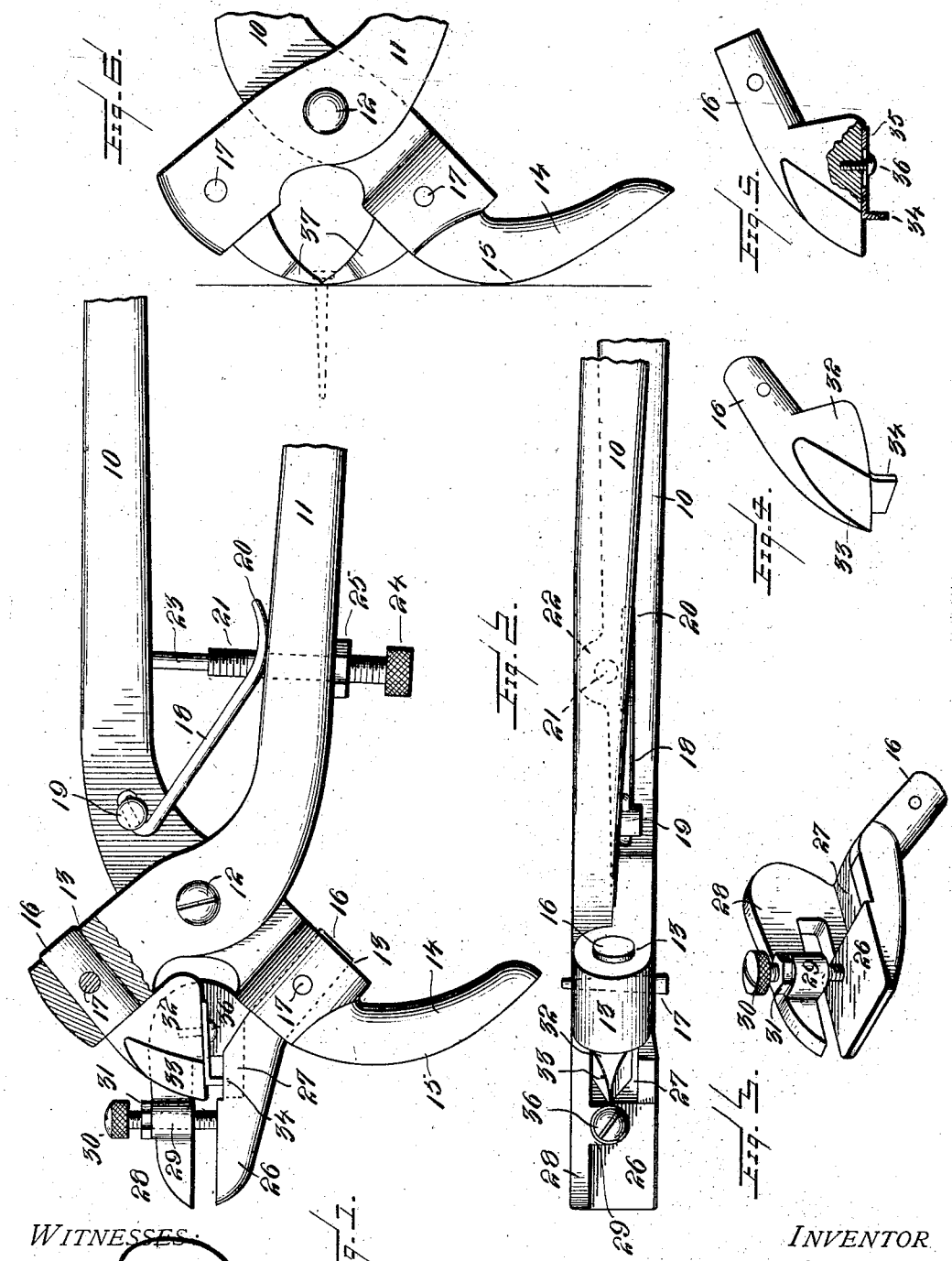

JULES L'HOTE, OF PITTSFIELD, MASSACHUSETTS.

SAW-SETTING TOOL.

942,573.

Specification of Letters Patent. Patented Dec. 7, 1909.

Application filed November 3, 1908. Serial No. 460,896.

*To all whom it may concern:*

Be it known that I, JULES L'HOTE, a citizen of the Republic of France, residing at Pittsfield, county of Berkshire, and State of Massachusetts, have invented certain new and useful Improvements in Saw - Setting Tools, of which the following is a specification, reference being had therein to the accompanying drawing.

This invention relates to a combination tool of the pincer type, and particularly to a structure adapted to receive saw setting jaws or jaws for other uses.

An object of the invention is to provide a novel and improved form of saw setting jaws one of which comprises an anvil member having a device adjustable relative to the thickness of the saw and an opposing setting member provided with a beveled point and adjustable means for determining the depth or length of the tooth to be set.

Other and further objects and advantages of the invention will be hereinafter fully set forth and the novel features thereof defined by the appended claims.

In the drawing:—Figure 1 is a side elevation with parts in section: Fig. 2 is a top plan: Fig. 3 is a detail perspective of the anvil jaw: Fig. 4 is a similar view of the coöperating setting jaw: Fig. 5 is an elevation with parts in section of the setting jaw: Fig. 6 is an elevation showing the application of a modified form of jaw to the handle members.

Like numerals refer to like parts in the several views of the drawing.

The numerals 10 and 11 designate the handle members of the pincers by which they are operated, these members being pivoted together at 12 and each provided with a socket 13 to receive the jaws to be used therewith. Extending from one of these sockets is the fulcrum 14 having the curved outer face 15 adapted to be rocked upon the base, as indicated in Fig. 6, when the jaws are applied for pulling purposes. Each of the jaws used herein is provided with a shank 16 having an aperture laterally therethrough and disposed in alinement with corresponding apertures in the side walls of the recess 13. Through these apertures the holding pin 17 is passed, this pin being of any desired configuration, preferably, tapering, as shown in Fig. 2. The handle members are normally separated by means of the spring 18 secured to one member at 19 and bearing at its end 20 upon the opposite member, while the extent of movement of the handles toward each other and the consequent travel of the jaws carried thereby is limited by a screw member 21 threaded in the socket 22 carried by one of the handles and adapted at its free end 23 to engage the opposite handle. This screw is provided with the operating head 24 and the lock nut 25.

The handle members may be provided with jaws of different characters, but a novel and improved form of saw setting jaw is shown in Figs. 1 to 5, and comprises the base or anvil jaw 26 having a depressed portion 27 at its rear and the goose neck wall 28 at one side thereof provided with the threaded laterally disposed lug 29. In this lug the screw 30 is mounted and is adjustable toward and from the upper face of the anvil 26 relative to the thickness of the saw blade so that it may be held against lateral movement during the setting action. This screw is adapted to be locked in position by the nut 31, as shown, and the anvil jaw is provided with the shank 16 having an aperture to receive the pin 17 as before described. Coöperating with this anvil jaw is the setting jaw 32 having its front or point tapered to substantially V-shaped, as shown at 33 so as to engage a side of the saw tooth and force it laterally to the saw body during the setting action. The under side of this setting jaw is flat and provided with a gage plate 34 by which the depth or length of the saw tooth to be bent is determined, this gage being carried by a slotted plate 35 which is adjustably mounted on the under face of the jaw by means of the screw 36, as shown in Fig. 5. Other forms of jaws may be used, for instance, as shown in Fig. 6, where nail drawing jaws 37 may be applied to the handle members and coöperate with the fulcrum extension 14 in securing the leverage for withdrawing nails or other objects grasped by these jaws.

In the operation of the saw setting jaws it will be seen that the anvil member is adjustable relative to the thickness of the saw, while the depth or length of the tooth to be set may be gaged by the plate carried by the setting member so that the tapered portion of this plate extending beyond the gage contacts with the tooth and effects the setting action by simply closing the handle members toward each other, and the extent of such movement and the consequent lateral deflection of the tooth is governed by the screw member carried by one of the jaws and engaging the other jaw. It will be obvious that these saw setting members may be removed when their use is not desired, and other members, such as shown in Fig. 6 substituted, thus rendering the tool capable of numerous uses by simply substituting jaws of different characters. The invention therefore presents a simple, economically manufactured and very efficient tool in the arts.

Having described my invention and set forth its merits, what I claim and desire to secure by Letters Patent is:—

1. In a tool of the class described, pivoted handle members, an anvil jaw carried by one of said members and having a flat supporting face and a saw setting recess, an auxiliary setting jaw having an inclined setting point disposed to travel above the recess of said anvil, and a gage plate mounted upon the under face of said setting jaw and having a depending portion extending laterally of the setting point and adapted to engage the tooth being set.

2. In a tool of the class described, pivoted handle members, an anvil jaw carried by one of said members and having a flat supporting surface and a saw setting recess, an adjustable device disposed above said surface, an auxiliary setting jaw having an inclined setting point disposed to travel above the recess of said anvil jaw, and a slotted gage plate mounted upon the under face of said setting jaw and provided with a depending portion extending laterally of the setting point and adjustable relatively to the point of said setting jaw.

3. In a tool of the class described, pivoted handle members, a jaw mounted in one of said members and having a fixed flat anvil face and a recessed portion at its rear, an upward extension at one side of said face provided with a laterally disposed threaded socket, an adjusting screw mounted in said socket for movement toward and from the anvil face of the jaw, and a coöperating setting jaw carried by the opposite handle member and having a gage plate mounted thereon with a depending portion extending laterally of the setting point and adjustable relatively to the point of said setting jaw.

In testimony whereof I affix my signature in presence of two witnesses.

JULES L'HOTE.

Witnesses:
CHAS. E. HIBBARD,
EDWARD L'HOTE.